US007017073B2

(12) United States Patent
Nair et al.

(10) Patent No.: US 7,017,073 B2
(45) Date of Patent: Mar. 21, 2006

(54) METHOD AND APPARATUS FOR FAULT-TOLERANCE VIA DUAL THREAD CROSSCHECKING

(75) Inventors: Ravi Nair, Briarcliff Manor, NY (US); James E. Smith, Madison, WI (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 10/083,579

(22) Filed: Feb. 27, 2002

(65) Prior Publication Data

US 2002/0133751 A1 Sep. 19, 2002

Related U.S. Application Data

(60) Provisional application No. 60/272,138, filed on Feb. 28, 2001.

(51) Int. Cl.
*G06F 11/00* (2006.01)

(52) U.S. Cl. .......................................... 714/11; 714/10

(58) Field of Classification Search .................. 714/10, 714/11, 31, 37, 48
See application file for complete search history.

(56) References Cited

U.S. PATENT DOCUMENTS

| | | | | |
|---|---|---|---|---|
| 5,016,249 A * | 5/1991 | Hurst et al. | 714/24 |
| 5,138,708 A * | 8/1992 | Vosbury | 714/11 |
| 5,388,242 A * | 2/1995 | Jewett | 711/113 |
| 5,452,443 A * | 9/1995 | Oyamada et al. | 714/10 |
| 5,764,660 A * | 6/1998 | Mohat | 714/820 |
| 5,896,523 A * | 4/1999 | Bissett et al. | 713/400 |
| 5,991,900 A * | 11/1999 | Garnett | 714/56 |
| 6,385,755 B1 * | 5/2002 | Shimomura et al. | 714/819 |
| 6,499,048 B1 * | 12/2002 | Williams | 718/102 |
| 6,757,811 B1 * | 6/2004 | Mukherjee | 712/220 |
| 6,928,585 B1 * | 8/2005 | Bartley | 714/23 |
| 6,948,092 B1 * | 9/2005 | Kondo et al. | 714/12 |

OTHER PUBLICATIONS

Steven K. Reinhardt and Shubhendu S. Mukhrjee, "Transient Fault Detection via Simultaneous Multithreading," Paper appearing in 27th Annual International Symposium on Computer Architecture, Jun. 2000, 12 pages.

* cited by examiner

*Primary Examiner*—Scott Baderman
*Assistant Examiner*—Gabriel L. Chu
(74) *Attorney, Agent, or Firm*—McGinn IP Law Group, PLLC; Satheesh Karra, Esq.

(57) ABSTRACT

A method (and structure) of concurrent fault crosschecking in a computer having a plurality of simultaneous multithreading (SMT) processors, each SMT processor simultaneously processing a plurality of threads, includes processing a first foreground thread and a first background thread on a first SMT processor and processing a second foreground thread and a second background thread on a second SMT processor. The first background thread executes a check on the second foreground thread and the second background thread executes a check on the first foreground thread, thereby achieving a crosschecking of the execution of the threads on the processors.

24 Claims, 2 Drawing Sheets

METHOD AND APPARATUS FOR FAULT-TOLERANCE VIA DUAL THREAD CROSSCHECKING

CROSS-REFERENCE TO RELATED APPLICATIONS

This Application claims priority to provisional Application No. 60/272,138, filed Feb. 28, 2001, entitled "Fault-Tolerance via Dual Thread Crosschecking", the contents of which is incorporated by reference herein.

BACKGROUND OF THE INVENTION

1. Field of the Invention

The present invention generally relates to fault checking in computer processors, and more specifically, to a computer which has processors associated in pairs, each processor capable of simultaneously multithreading two threads (e.g., a foreground thread and a background thread) and in which the background thread of one processor checks the foreground thread of its associated processor.

2. Description of the Related Art

In a typical superscalar processor, most computing resources are not used every cycle. For example, a cache port may only be used half the time, branch logic may only be used a quarter of the time, etc. Simultaneous multithreading (SMT) is a technique for supporting multiple processing threads in the same processor by sharing resources at a very fine granularity. It is commonly used to more fully utilize processor resources and increase overall throughput.

In SMT, process state registers are replicated, with one set of registers for each thread to be supported. These registers include the program counter, general-purpose registers, condition codes, and various process-related state registers. The bulk of the processor hardware is shared among the processing threads. Instructions from the threads are fetched into shared instruction issue buffers. Then, they are issued and executed, with arbitration for resources taking place when there is a conflict. For example, arbitration would occur if two threads each want to access cache through the same port. This arbitration can be done either in a "fair" method, such as a round-robin method, or the threads can be prioritized, with one thread always getting higher priority over another when there is a conflict.

Dual Processors Checking in Lockstep

Here, two full processors are dedicated to run the same thread and their results are checked. This approach is used in the IBM S/390 G5™. The primary advantage is that all faults, both transient and solid faults, affecting a single processor are covered. A disadvantage is that two complete processors are required for the execution of one thread.

Dual Processors Operating in High Performance/High Reliability Mode

Here, two full processors normally operate as independent processors in the high performance mode. In the high reliability mode, they run the same thread and the results are compared in a manner similar to the previous case. Examples of these are U.S. Patent Application Numbers TBD, and assigned to the present assignee and having app. Ser. Nos. 09/734,117 and 09/791,143, both of which are herein incorporated by reference.

Redundant SMT Approaches Using a Single SMT Processor (AR-SMT and SRT)

Here, the two threads in the same SMT processor execute the same program with some time lag between them. Because the check thread lags in time, it can take advantage of branch prediction and cache prefetching. Consequently, the check thread does not consume all the resources (and time) that the main thread consumes. Consequently, a primary advantage is fault tolerance with less than full hardware duplication and relatively little performance loss. However, a main disadvantage is that solid faults and transient faults of longer than a certain duration (depending on the inter-thread time lag) are not detected because faults of this type may result in correlated errors in the two threads.

SUMMARY OF THE INVENTION

In view of the foregoing and other problems, drawbacks, and disadvantages of the conventional methods and systems, the present invention describes a multiprocessor system having at least one associated pair of processors, each processor capable of simultaneously multithreading two threads, i.e., a foreground thread and a background thread, and in which the background thread of one processor checks the foreground thread of its associated paired processor.

It is, therefore, an object of the present invention to provide a structure and method for concurrent fault checking in computer processors, using under-utilized resources.

It is another object of the present invention to provide a structure and method in which processing components in a computer provide a crosschecking function.

It is another object of the invention to provide a structure and method in which processors are designed and implemented in pairs for crosschecking of the processors.

It is another object of the present invention in which all faults, both transient and permanent, affecting one processor of a dual-processor architecture are detected.

It is another object of the present invention to provide a highly reliable computer system with relatively little performance loss. Fault coverage is high, including both transient and permanent faults. Most checking is performed with otherwise idle resources, resulting in relatively low performance loss.

It is another object of the present invention to provide high reliability for applications requiring high reliability and availability, such as Internet-based applications in banking, airline reservations, and many forms of e-commerce.

It is another object of the present invention to provide a system having flexibility to select either a high performance mode or a high reliability mode by providing capability to enable/disable the checking mode. There are server environments in which users or system administrators may want to select between high reliability and maximum performance.

To achieve the above objects and goals, according to a first aspect of the present invention, disclosed herein is a method of multithread processing on a computer, including processing a first thread on a first component capable of simultaneously executing at least two threads, processing the first thread on a second component capable of simultaneously executing at least two threads, and comparing a result of the processing on the first component with a result of the processing on the second component.

According to a second aspect of the present invention, herein described is a method and structure of concurrent fault crosschecking in a computer having a plurality of simultaneous multithreading (SMT) processors, each SMT processor processing a plurality of threads, including processing a first foreground thread and a first background thread on a first SMT processor and processing a second foreground thread and a second background thread on a second SMT processor, wherein the first background thread executes a check on the second foreground thread and the second background thread executes a check on the first foreground thread, thereby achieving a crosschecking of said the SMT processor and the second SMT processor.

According to a third aspect of the present invention, herein is described a signal-bearing medium tangibly embodying a program of machine-readable instructions executable by a digital processing apparatus to perform the method of multithread processing described above.

With the unique and unobvious aspects of the present invention, processors can be designed and implemented in pairs to allow crosschecking of the processors. In this simple exemplary embodiment, each processor in a pair is capable of simultaneously multithreading two threads. In each processor, one thread can be a foreground thread and the other can be a background check thread for the foreground thread in the other processor. Hence, in this simple exemplary implementation of the present invention, there are a total of four threads, two foreground threads and two check threads, and the paired processors crosscheck each other.

BRIEF DESCRIPTION OF THE DRAWINGS

The foregoing and other objects, aspects and advantages will be better understood from the following detailed description of the invention with reference to the drawings in which.

DETAILED DESCRIPTION OF A PREFERRED EMBODIMENT OF THE INVENTION

Figure 1:
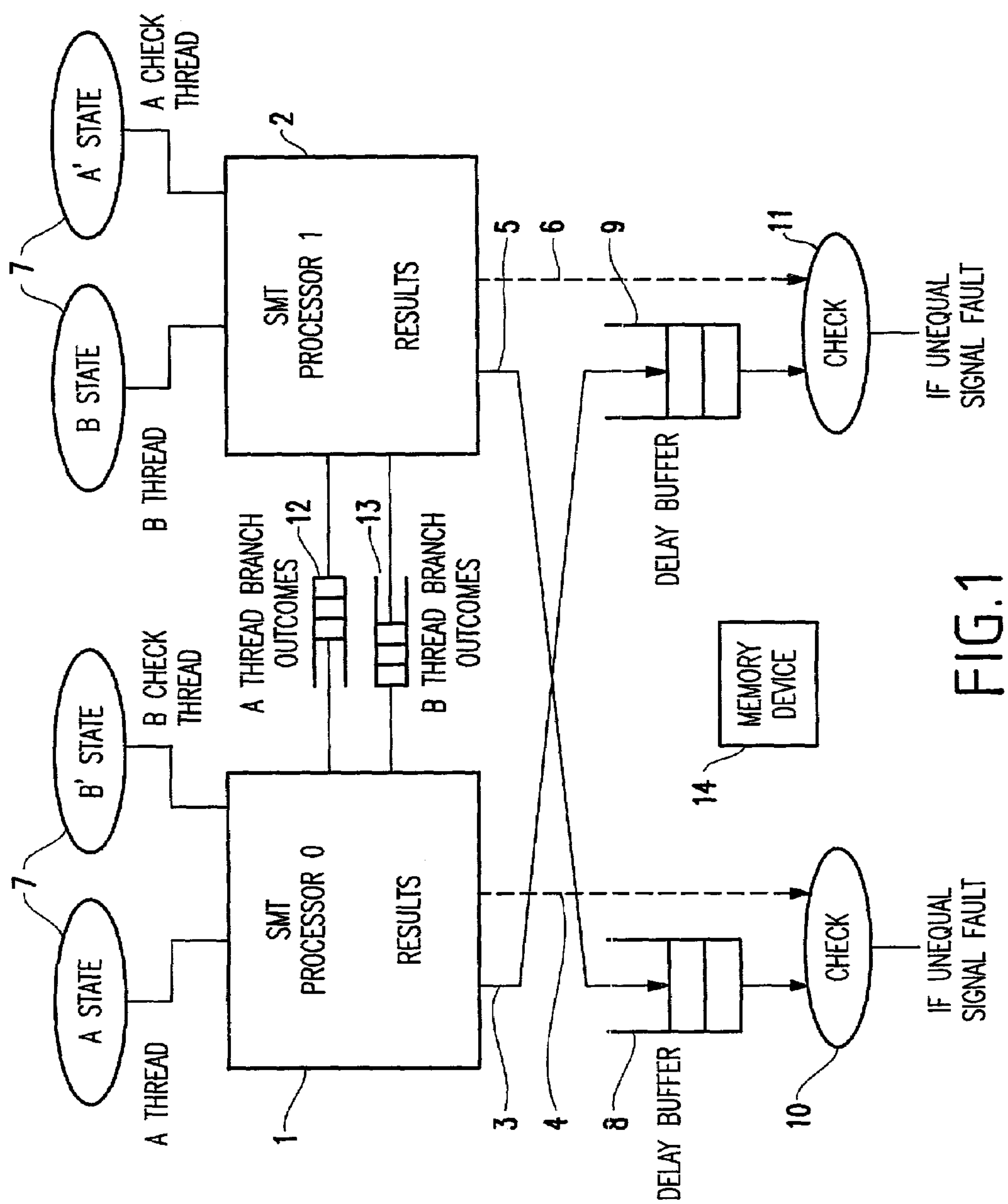
FIG. 1 shows a schematic diagram illustrating an exemplary preferred embodiment of the invention.

Referring now to FIG. 1, processors are illustrated which can be constructed with support for two simultaneous threads, and such that one thread be given higher priority over the other. Hence, the higher priority (foreground) thread can proceed at (nearly) full speed, and the lower priority thread (background) will consume whatever resources are left over. It is noted that the foreground thread may occasionally be slowed down by the background thread, for example, when the background thread is already using a shared resource that the foreground thread needs.

As further illustrated in FIG. 1, for exemplary purposes only, SMT processors 1, 2 are paired in this discussion, with interconnections between the paired processors for checking, as shown in the figure. Although FIG. 1 shows only two processors, a person of ordinary skill would readily see that the number of processors or number of threads could be increased.

The two types of threads are represented by the solid and dashed lines in the figure. The foreground threads (A,B) are solid (reference numerals 3, 5) and the background threads (A',B') are dashed (reference numerals 4, 6). As shown, the paired SMT processors are each executing a foreground thread (A and B), and they are each executing a background thread (B' and A'). Each thread has its set of state registers 7.

A foreground thread and its check thread are executed on different SMT processors, so that a fault (either permanent or transient) that causes an error in one processor will be crosschecked by the other. That is, computation performed by a foreground thread is duplicated in the background thread of the other processor in the pair, so that all results are checked to make sure they are identical. If not, then a fault is indicated.

Figure 2:
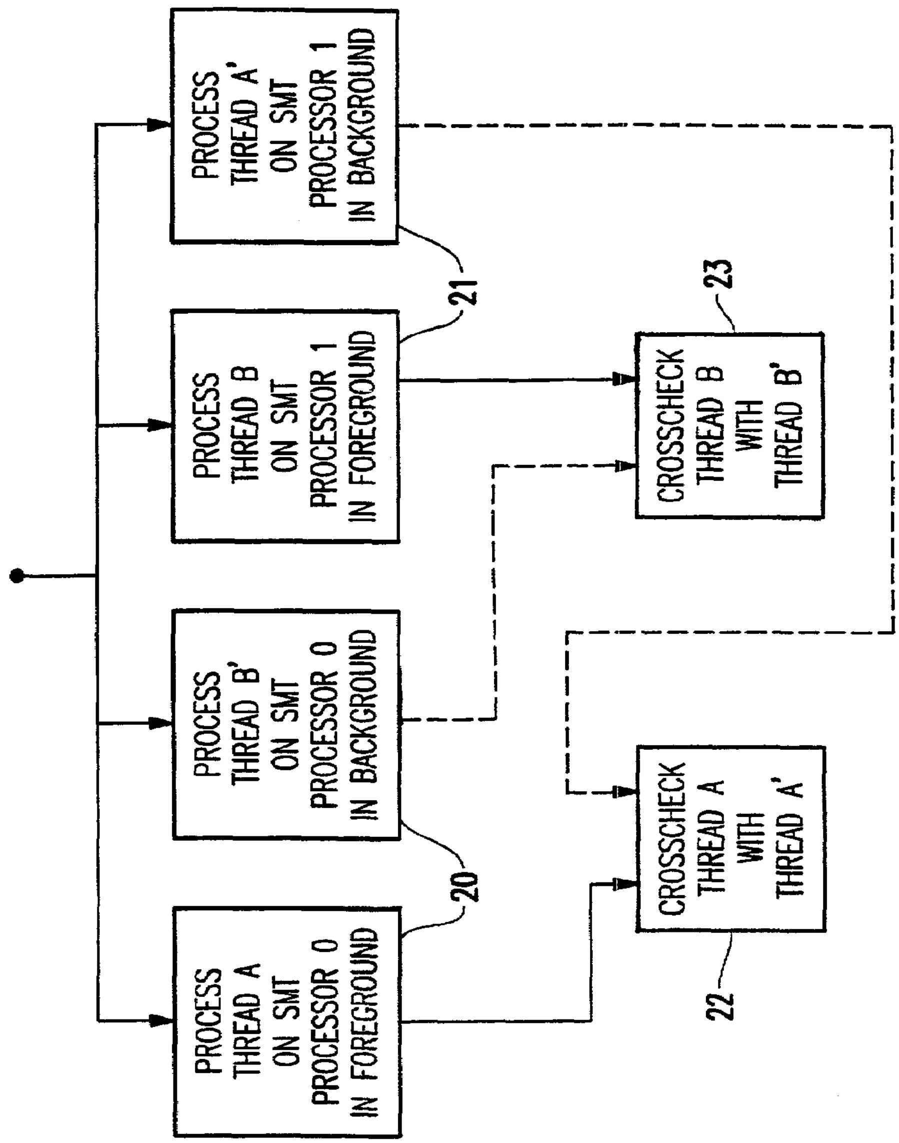
FIG. 2 is a flowchart of a preferred embodiment of the invention.

For clarity, the following terminology is used: the two threads running on the same processor are the "foreground" and "background" threads. With respect to a given foreground thread, the "check thread" is the background thread running on the other SMT processor. Hence, in FIG. 1, with respect to foreground thread A, the background thread is B', and the check thread is A'. Furthermore, in the following description, it will be exemplarily assumed that foreground thread A is being checked by thread A', and the threads are labeled accordingly. Of course, thread B is also being checked in an analogous manner by B'. FIG. 2 shows a flowchart for this basic process of crosschecking in which the first processor executes thread A in the foreground and thread B' in the background (step 20) and the second processor executes threads B and A' (step 21) and the threads are crosschecked (steps 22, 23).

The foreground thread A has high priority and ideally will execute at optimum speed. On the other hand, the check thread A' will naturally tend to run more slowly (e.g., because it has the lower priority than thread B in its shared SMT processor). This apparent speed mismatch will likely make complete checking impossible, or it will force the foreground thread A to slow down.

The present invention includes a method for resolving the performance mismatch between the foreground and check threads in such a way that high performance of the foreground is maintained and full checking is achieved. An important feature of this crosschecking method is that a foreground thread A and its check thread A' are not operating in lockstep. That is, each thread operates on its own priority. In effect, the check thread lags behind the foreground thread with a delay buffer 8, 9 absorbing the slack. Because A' is lagging behind thread A, the delay buffer holds completed values from thread A. When the check values become available, the check logic 10, 11 compares the results for equality. If unequal, then a fault is signaled. The delay buffer 10, 11 is a key element in equalizing performance of the foreground and check threads. It equalizes performance in the following ways:

1. By allowing the check thread A' to fall behind (up to the buffer length) there is more flexibility in scheduling the check thread "around" the resource requirements of the foreground thread B with which it shares an SMT processor. In particular, the thread B can be given higher priority, and the check thread A' uses otherwise idle resources. Of course, if the check thread A' falls too far behind thread A, the delay buffer will eventually fill up and the foreground thread A will be forced to stall if complete crosschecking is to be performed.

2. Because the foreground thread A is ahead of the check thread A', its true branch outcomes can be fed to the check thread via the branch outcome buffers 12, 13 shown in FIG. 1. These true branch outcomes are then used by the check thread A' to avoid branch prediction and speculative execution. That is, the check thread effectively has perfect branch prediction. Consequently, the check thread will have a performance advantage that will help it keep up with the foreground thread A, despite having a lower priority for hardware resources it shares with thread B.

3. If the paired SMT processors share lower level cache memories, for example a level 2 cache, then the foreground thread A essentially prefetches cache lines into the shared cache for the check thread A'. That is, the thread A may suffer a cache miss, but by the time A' is ready to make the same access, the line will be in the cache (or at least it will be on the way). It is noted that the shared cache is not shown in the FIG. 1 but is well-known in the art.

It is also noted FIG. 1 indicates a memory device 14 storing the instructions to execute the method of the present invention. This memory device 14 could be incorporated in a variety of ways into a multiprocessor system having one or more pairs of SMT processors and details of the specific memory device is not important. Examples would include an Application Specific Integrated Circuit (ASIC) that includes the instructions and where the ASIC may additionally include the SMT processors. Another example would be a Read Only Memory (ROM) device such as a Programmable Read Only Memory (PROM) chip containing micro-instructions for a pair of SMT processors.

Another feature of this approach is that the check threads can be selectively turned off and on. That is, the dual-thread crosschecking function can be disabled. This enable/disable capability could be implemented in any number of ways. Examples would include an input by an operator, a switch on a circuit board, or a software input at an operating system or applications program level.

When the check threads are off, the foreground threads will then run completely unimpeded (high performance mode). When checking is turned on, the foreground threads may run at slightly inhibited speed, but with high reliability. Changing between performance and high reliability modes can be useful within a program, for example when a highly reliable shared database is to be updated. Or it can be used for independent programs that may have different performance and reliability requirements.

The inventive method provides fault coverage similar to full duplication (all solid and transient faults), yet it does so at a cost similar to the AR-SMT and SRT approaches. That is, much less than full duplication is required and good performance is achieved even in the high-reliability mode.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of multithread processing on a computer, said method comprising:

processing a thread on a first component as a foreground thread, said first component capable of simultaneously executing at least two threads;

processing said thread on a second component as a background thread, said second component capable of simultaneously executing at least two threads; and comparing a result of said processing on said first component with a result of said processing on said second component, wherein an input selectively enables or disables said comparing.

2. The method of claim 1, wherein said processing said thread on said second component occurs at a time delayed from that of said processing said thread on said first component.

3. A method of multithread processing on a computer, said method comprising:

processing a thread on a first component, said first component capable of simultaneously executing at least two threads;

processing said thread on a second component, said second component capable of simultaneously executing at least two threads; and comparing a result of said processing on said first component with a result of said processing on said second component, wherein said processing said thread on said second component is performed at a priority lower than a priority of said processing said thread on said first component by being processed as a background thread rather than a foreground thread.

4. The method of claim 3, further comprising:

generating a fault signal if said comparison is not equal.

5. A method of multithread processing on a computer, said method comprising:

processing a thread on a first component, said first component capable of simultaneously executing at least two threads;

processing said thread on a second component, said second component capable of simultaneously executing at least two threads, said processing said thread on said first component occurring at a higher priority than said processing said thread on said second component; and comparing a result of said processing on said first component with a result of said processing on said second component, wherein said processing said thread on said second component uses information about an outcome of executing an instruction that is available from said processing said thread on said first component at said higher priority.

6. A method of concurrent fault crosschecking in a computer having a plurality of simultaneous multithreading (SMT) processors, each said SMT processor processing a plurality of threads, said method comprising:

processing a first foreground thread and a first background thread on a first SMT processor; and processing a second foreground thread and a second background thread on a second SMT processor, wherein said first background thread executes a check on said second foreground thread and said second background thread executes a check on said first foreground thread, thereby achieving a crosschecking of said first SMT processor and said second SMT processor.

7. The method of claim 6, wherein said first foreground thread has a higher priority than that of said first background thread and said second foreground thread has a higher priority than that of said second background thread.

8. The method of claim 6, further comprising:

storing each of a result of said processing said first foreground thread and said processing said second foreground thread in a memory for subsequent comparison with a corresponding result of said first and second background threads.

9. The method of claim 6, further comprising:

communicating, between said first SMT processor and said second SMT processor, a thread branch outcome for said first foreground thread and for said second foreground thread.

10. The method of claim 6, further comprising:

generating a signal if either of said checks are unequal.

11. The method of claim 6, further comprising:

providing a signal to enable or disable said concurrent fault crosschecking.

12. A computer, comprising:

a first simultaneous multithreading (SMT) processor; and a second simultaneous multithreading (SMT) processor, wherein said first SMT processor processes a first foreground thread and a first background thread and said second SMT processor processes a second foreground thread and a second background thread, and wherein said first background thread executes a check on said second foreground thread and said second background thread executes a check on said first foreground thread.

13. The computer of claim 12, wherein said first foreground thread has a higher priority than that of said first background thread, and said second foreground thread has a higher priority than that of said second background thread.

14. The computer of claim 12, further comprising:

a delay buffer storing a result of said first foreground thread; and a delay buffer storing a result of said second foreground thread.

15. The computer of claim 12, further comprising:

a memory storing a result of a thread branch outcome for said first foreground thread and a result of a thread branch outcome for said second foreground thread.

16. The computer of claim 15, wherein said memory storing said results of a thread branch outcome comprises a first memory for said first foreground thread and a second memory for said second foreground thread.

17. The computer of claim 12, further comprising:

a logic circuit comparing a result of said first foreground thread with a result of said second background thread and generating a signal if said results are not equal; and a logic circuit comparing a result of said second foreground thread with a result of said first background thread and generating a signal if said results are not equal.

18. The computer of claim 12, further comprising:

an input signal to determine whether said crosschecking process is one of enabled and disabled.

19. The computer of claim 12, further comprising:

a memory storing an information related to said processing by each of said first and second foreground threads, thereby providing to the respective first and second background threads an information to expedite processing.

20. The computer of claim 12, further comprising:

at least one output signal signifying that a result of at least one of said first and second background threads does not agree with a respective result of a check of said first and second foreground threads.

21. The computer of claim 12, comprising a plurality of pairs of SMT processors, wherein each said pair comprises a first simultaneous multithreading (SMT) processor and a second simultaneous multithreading (SMT) processor, said first SMT processor processes a first foreground thread and a first background thread and said second SMT processor processes a second foreground thread and a second background thread, and said first background thread executes a check on said second foreground thread and said second background thread executes a check on said first foreground thread.

22. A multiprocessor system executing a method of multithread processing on a computer, said method comprising:

processing a thread on a first component, said first component capable of simultaneously executing at least two threads;

processing said thread on a second component, said second component capable of simultaneously executing at least two threads; and comparing a result of said processing on said first component with a result of said processing on said second component, wherein said processing said thread on said second component is performed at a priority lower than a priority of said processing said thread on said first component by being processed as a background thread rather than a foreground thread.

23. An Application Specific Integrated Circuit (ASIC) containing a signal-bearing medium tangibly embodying a program of machine-readable instructions executable by a digital processing apparatus to perform a method of multithread processing, said method comprising:

processing a thread on a first component, said first component capable of simultaneously executing at least two threads;

processing said thread on a second component, said second component capable of simultaneously executing at least two threads; and comparing a result of said processing on said first component with a result of said processing on said second component, wherein said processing said thread on said second component is performed at a priority lower than a priority of said processing said thread on said first component by being processed as a background thread rather than a foreground thread.

24. A Read Only Memory (ROM) containing a signal-bearing medium tangibly embodying a program of machine-readable instructions executable by a digital processing apparatus to perform a method of multithread processing, said method comprising:

processing a thread on a first component, said first component capable of simultaneously executing at least two threads;

processing said on a second component, said second component capable of simultaneously executing at least two threads; and comparing a result of said processing on said first component with a result of said processing on said second component, wherein said processing said thread on said second component is performed at a priority lower than a priority of said processing said thread on said first component by being processed as a background thread rather than a foreground thread.

* * * * *